(12) United States Patent
Cremin et al.

(10) Patent No.: US 8,396,990 B2
(45) Date of Patent: Mar. 12, 2013

(54) TRANSCODING WEB RESOURCES

(75) Inventors: Ronan Cremin, Dublin (IE); Trey Harvin, Dublin (IE); Francesco Cetraro, Dublin (IE); Huw Spiers, Dublin (IE)

(73) Assignee: Afilias Technologies Limited, Dublin (IE)

( * ) Notice: Subject to any disclaimer, the term of this patent is extended or adjusted under 35 U.S.C. 154(b) by 203 days.

(21) Appl. No.: 12/760,205

(22) Filed: Apr. 14, 2010

(65) Prior Publication Data

US 2010/0274870 A1    Oct. 28, 2010

Related U.S. Application Data

(63) Continuation-in-part of application No. PCT/GB2009/002421, filed on Oct. 9, 2009.

(30) Foreign Application Priority Data

Oct. 10, 2008    (GB) .................................. 0818641.3

(51) Int. Cl.
    *G06F 15/16*    (2006.01)
(52) U.S. Cl. ....................................... 709/245; 709/228
(58) Field of Classification Search .......... 709/201–203, 709/227–228, 238–239, 245–247; 715/700, 715/864
    See application file for complete search history.

(56) References Cited

U.S. PATENT DOCUMENTS

| 5,884,246 | A |  | 3/1999 | Boucher et al. |
| 6,112,192 | A |  | 8/2000 | Capek |
| 6,421,733 | B1 |  | 7/2002 | Tso et al. |
| 6,611,876 | B1 | * | 8/2003 | Barrett et al. ................. 709/246 |
| 6,615,212 | B1 | * | 9/2003 | Dutta et al. ............................ 1/1 |
| 6,662,218 | B2 |  | 12/2003 | Mighdoll et al. |
| 6,747,365 | B2 |  | 6/2004 | Reinold et al. |
| 6,760,711 | B1 |  | 7/2004 | Gillett et al. |
| 6,888,837 | B1 |  | 5/2005 | Cunningham et al. |

(Continued)

FOREIGN PATENT DOCUMENTS

| AU | 2008203506 | 8/2008 |
| CN | 201181942 | 1/2009 |

(Continued)

OTHER PUBLICATIONS

ESPN. Dec. 12, 2007. Internet Archive. <http://web.archive.org/web/20071212030046/http://espn.go.com/>("ESPN").*

(Continued)

*Primary Examiner* — Brendan Higa
(74) *Attorney, Agent, or Firm* — Sheridan Ross P.C.

(57) ABSTRACT

A transcoding system comprises a mobile communication device that retrieves a web resource using a mobile communication network and the internet via a transcoder. The web resource may comprise a web page intended for use by personal computers (PCs) stored at a web server. The mobile communication device sends a request to the transcoder for the web page, the request including a first URL. In one embodiment, the transcoder recognizes the first URL as relating to a web page on a transcode list. Accordingly, the transcoder retrieves a web page using a second URL based on the first URL according to a mapping record. The transcoder then transcodes the retrieved web page and sends the transcoded web page to the mobile communication device. In another embodiment, the transcoder does not recognize the first URL and instead removes the top level domain of the first URL to generate a truncated URL. The transcoder then retrieves web resources using the truncated URL and variations thereof and, based on an analysis of the web resources retrieved, sends the web resource most likely to be appropriate for the mobile communication device to the device.

10 Claims, 4 Drawing Sheets

U.S. PATENT DOCUMENTS

| | | |
|---|---|---|
| 6,925,595 B1 | 8/2005 | Whitledge et al. |
| 6,944,665 B2 | 9/2005 | Brown et al. |
| 6,957,394 B1 | 10/2005 | Fernandez et al. |
| 7,178,101 B2 | 2/2007 | Tunning |
| 7,388,844 B1 | 6/2008 | Brown et al. |
| 7,584,486 B2 | 9/2009 | Yun et al. |
| 7,823,083 B2 | 10/2010 | Rohrabaugh et al. |
| 7,827,312 B2 | 11/2010 | Ramaswamy et al. |
| 7,904,455 B2 | 3/2011 | Chiu et al. |
| 7,962,640 B2 * | 6/2011 | Lee ................ 709/231 |
| 8,041,346 B2 | 10/2011 | Tyhurst et al. |
| 8,081,956 B2 | 12/2011 | Aaltonen et al. |
| 2002/0003547 A1 * | 1/2002 | Wang et al. ............ 345/727 |
| 2002/0103881 A1 | 8/2002 | Grande et al. |
| 2002/0120684 A1 | 8/2002 | Christfort et al. |
| 2002/0133569 A1 | 9/2002 | Huang et al. |
| 2002/0186248 A1 | 12/2002 | Ramanathan et al. |
| 2002/0198937 A1 * | 12/2002 | Diwan et al. ........... 709/203 |
| 2003/0004984 A1 * | 1/2003 | Chou ...................... 707/500 |
| 2003/0009567 A1 | 1/2003 | Farouk |
| 2003/0023756 A1 | 1/2003 | Awamoto et al. |
| 2003/0061288 A1 | 3/2003 | Brown et al. |
| 2003/0061299 A1 | 3/2003 | Brown et al. |
| 2003/0091166 A1 | 5/2003 | Hershenson |
| 2003/0172186 A1 | 9/2003 | Dunn et al. |
| 2003/0229718 A1 | 12/2003 | Tock et al. |
| 2004/0015567 A1 | 1/2004 | Ziebold et al. |
| 2004/0049574 A1 | 3/2004 | Watson et al. |
| 2004/0064469 A1 | 4/2004 | Takahashi et al. |
| 2004/0117197 A1 * | 6/2004 | Dutta et al. ................ 705/1 |
| 2004/0148571 A1 * | 7/2004 | Lue ............................ 715/514 |
| 2004/0205621 A1 | 10/2004 | Johnson et al. |
| 2004/0205650 A1 | 10/2004 | Cheng |
| 2004/0228343 A1 * | 11/2004 | Molteni et al. .......... 370/392 |
| 2004/0243931 A1 | 12/2004 | Stevens et al. |
| 2004/0255244 A1 | 12/2004 | Filner et al. |
| 2004/0267610 A1 * | 12/2004 | Gossett et al. ............. 705/14 |
| 2005/0015365 A1 | 1/2005 | Kavacheri et al. |
| 2005/0015474 A1 | 1/2005 | Kavacheri et al. |
| 2005/0132286 A1 | 6/2005 | Rohrabaugh et al. |
| 2005/0160065 A1 | 7/2005 | Seeman |
| 2006/0015358 A1 | 1/2006 | Chua |
| 2006/0036767 A1 * | 2/2006 | Ryan ......................... 709/245 |
| 2007/0168465 A1 | 7/2007 | Toppenberg et al. |
| 2007/0180432 A1 | 8/2007 | Gassner et al. |
| 2007/0288841 A1 | 12/2007 | Rohrabaugh et al. |
| 2007/0294646 A1 | 12/2007 | Timmons |
| 2008/0022374 A1 | 1/2008 | Brown et al. |
| 2008/0028335 A1 | 1/2008 | Rohrabaugh et al. |
| 2008/0065980 A1 | 3/2008 | Hedbor |
| 2008/0071857 A1 * | 3/2008 | Lie .............................. 709/203 |
| 2008/0077855 A1 | 3/2008 | Lev et al. |
| 2008/0201452 A1 | 8/2008 | Athas et al. |
| 2008/0235566 A1 | 9/2008 | Carlson et al. |
| 2009/0006643 A1 * | 1/2009 | Lee ............................ 709/231 |
| 2009/0089448 A1 | 4/2009 | Sze et al. |
| 2009/0094137 A1 | 4/2009 | Toppenberg et al. |
| 2009/0204808 A1 | 8/2009 | Guo et al. |
| 2009/0300111 A1 | 12/2009 | Rana |
| 2009/0319778 A1 | 12/2009 | Rzepecki et al. |
| 2010/0005310 A1 | 1/2010 | Gentry et al. |
| 2010/0017464 A1 | 1/2010 | Cheng et al. |
| 2010/0017502 A1 | 1/2010 | Cheng et al. |
| 2010/0043017 A1 * | 2/2010 | Paul et al. ................ 719/328 |
| 2010/0095024 A1 * | 4/2010 | Wyler et al. ............. 709/246 |
| 2010/0114982 A1 * | 5/2010 | Ferrell et al. ............. 707/803 |
| 2010/0146413 A1 * | 6/2010 | Yu ............................... 715/760 |
| 2010/0199197 A1 | 8/2010 | Faletski et al. |
| 2010/0299395 A1 | 11/2010 | Klassen |
| 2011/0047249 A1 | 2/2011 | Pearce |
| 2011/0078120 A1 | 3/2011 | Tyhurst et al. |
| 2011/0099467 A1 | 4/2011 | Kapur et al. |
| 2011/0231782 A1 | 9/2011 | Rohrabaugh et al. |
| 2011/0258250 A1 | 10/2011 | Cremin |
| 2011/0289316 A1 | 11/2011 | Cremin et al. |
| 2011/0307776 A1 | 12/2011 | Cremin |
| 2012/0011446 A1 | 1/2012 | Harvin et al. |

FOREIGN PATENT DOCUMENTS

| | | |
|---|---|---|
| EP | 0940960 | 9/1999 |
| EP | 1376990 | 1/2004 |
| EP | 1641211 | 3/2006 |
| EP | 1923798 | 5/2008 |
| EP | 2077521 | 7/2009 |
| GB | 2445667 | 7/2008 |
| WO | WO 98/56159 | 12/1998 |
| WO | WO 01/22683 | 3/2001 |
| WO | WO 01/30043 | 4/2001 |
| WO | WO 01/88733 | 11/2001 |
| WO | WO 02/087135 | 10/2002 |
| WO | WO 2004/040481 | 5/2004 |
| WO | WO 2004/088951 | 10/2004 |
| WO | WO 2006/008559 | 1/2006 |
| WO | WO 2007/089320 | 8/2007 |
| WO | WO 2007/137166 | 11/2007 |
| WO | WO 2008/073207 | 6/2008 |
| WO | WO 2009/012461 | 1/2009 |
| WO | WO 2009/036318 | 3/2009 |
| WO | WO 2009/047783 | 4/2009 |
| WO | WO 2009/051471 | 4/2009 |

OTHER PUBLICATIONS

International Search Report for International (PCT) Patent Application No. PCT/EP2011/058137, mailed Jul. 18, 2011, 3 pages.

Written Opinion for International (PCT) Patent Application No. PCT/EP2011/058137, mailed Jul. 18, 2011, 5 pages.

Parziale et al., "TCP/IP Tutorial and Technical Overview (IBM Redbook)", [Online] Dec. 2006, ISBN 978-0-7384-9465-5, pp. 426-480, retrieved from http://www.redbooks.ibm.com/redbooks/pdfs/gg243376.pdf on Feb. 4, 2010.

Nelson, "Fast string searching with Suffix Trees," published Aug. 1, 1996, at http://marknelson.us/1996/08/01/suffix-trees, 11 pages.

Trevor et al., "From Desktop to Phonetop: A UI for Web Interaction on Very Small Devices," Proceedings of the 14th Annual ACM Symposium on User Interface Software and Technology, 2001, at http://jonathantrevor.net/trevor/papers/uist2001.pdf, pp. 121-130.

International Search Report for International (PCT) Patent Application No. PCT/GB/2009/000401, dated Mar. 5, 2010.

Written Opinion for International (PCT) Patent Application No. PCT/GB209/000401, dated Mar. 5, 2010.

Search Report for UK Patent Application No. GB082585.0, mailed Jun. 23, 2008, 4 pages.

International Search Report for International (PCT) Patent Application No. PCT/GB2009/002420, mailed Mar. 3, 2010, 4 pages.

Written Opinion for International (PCT) Patent Application No. PCT/GB2009/002420, mailed Mar. 3, 2010, 5 pages.

Official Action for U.S. Appl. No. 12/867,465, mailed Jan. 31, 2012 12 pages.

Official Action for U.S. Appl. No. 12/762,521, mailed Jul. 11, 2012 21 pages.

Official Action for U.S. Appl. No. 12/783,424, mailed Jul. 23, 2012 12 pages.

Official Action for U.S. Appl. No. 12/867,465, mailed Aug. 27, 2012 12 pages.

* cited by examiner

TRANSCODING WEB RESOURCES

This application is a Continuation-In-Part of WIPO Application No. PCT/GB2009/002421, filed Oct. 9, 2009, which designated the United States, and which claimed the benefit of GB0818641, filed Oct. 10, 2009, the entire disclosures of each are incorporated by reference herein.

FIELD OF THE INVENTION

The present invention relates to providing mobile versions of web resources. The invention has particular, but not exclusive, application to enabling the most appropriate mobile web resources available to be delivered to mobile communication devices and to transcoding web resources for use by mobile communication devices.

BACKGROUND TO THE INVENTION

Most web resources are intended for use by desktop and laptop personal computers (PCs). This means that they are often unsuitable for use by mobile communication devices. Web resources, typically web sites and web pages, may include script, graphics, images, animations, video data, audio data, layouts etc. that are not supported by a mobile communication device. For example, a web site may include objects encoded using Java® or Adobe® Flash script, but a mobile communication device may not have the correct software to use such objects. Similarly, an image on a web site may be too large to be displayed on a mobile communication device.

In light of this, web resources specifically encoded for use by mobile communication devices are sometimes provided. Usually, web resources specifically encoded for use by mobile communication devices are based on web resources intended for use by PCs. For example, an organisation may have two web sites, one for use by PCs and the other specifically encoded for use by mobile communication devices. There is therefore duplication of effort in providing the same content for use by both PCs and mobile communication devices. For this reason, only large and well resourced organisations or those with a particular reason to target mobile communication devices tend to provide web resources specifically encoded for use by mobile communication devices. There is therefore a need to make it easier to provide web resources suitable for use by mobile communication devices.

In order to address this need, mobile network operators convert web resources intended for use by PCs to be suitable for use by mobile communication devices. This conversion is known as transcoding. When the user of a mobile communication device seeks to access a given web resource via the mobile communication network, instead of the mobile communication device being provided with the web resource itself, it is provided with a transcoded version of the web resource.

In more detail, the mobile communication device may send a request for a web resource, which request includes an internet domain name, e.g. "www.bobspizzashop.com". The mobile network retrieves the web resource from the web server using the internet domain name (or, more specifically, an Internet Protocol (IP) address for the server at which the web resource is located, which IP address can be retrieved from the Domain Name System (DNS) of the internet using the internet domain name). However, instead of delivering the web resource straight to the mobile communication device, the mobile communication network first transcodes the web resource.

Typically, the transcoding involves identifying the type of mobile communication device that made the request and adapting the web resource to be suitable for that device. For example, if the web resource is encoded using script that is not supported by the type of mobile communication device, the web resource may be converted to script that is supported by the type of mobile communication device. Similarly, an image included in the web resource may be resized to suit the limitations of the display of the mobile communication device.

The transcoding of web resources by mobile communication networks has some difficulties. In particular, the transcoding is done without the permission and often without the knowledge of the owners of the web resources. A web resource may also be transcoded differently by different mobile communication networks. So, even when the owner is aware that transcoding may take place, it can be difficult for them to take account of how a web resource might be transcoded when they first create the web resource. Accordingly, the owners of web resources cannot control user experience of their web resources.

There also exists a difficulty even when an organisation has provided web resources specifically encoded for use by mobile communication devices, e.g. a mobile version of a web site, in that it may prove difficult for a user to locate them. In particular, there is no standard format of internet domain name for mobile versions of web sites. If a web site designed for PCs hosted at an IP address associated with the internet domain name "bobspizzashop.com", a mobile version of the web site might be hosted at an IP address associated with the internet domain name "bobspizzashop.mobile.com", "mobile.bobsspizzashop.com", "m.bobspizzashop.com" or any other internet domain name. This is confusing for the user and can mean that mobile versions of web sites are not delivered to mobile communication devices as extensively and reliably as desired.

The present invention seeks to overcome these problems.

SUMMARY OF THE INVENTION

According to a first aspect of the present invention, there is provided method of providing a transcoded web resource to a user, the method comprising:
  receiving a request from the user, the request including a first internet domain name;
  identifying a second internet domain name based on the first internet domain name;
  retrieving an existing web resource identified by the second internet domain name;
  transcoding the existing web resource into the transcoded web resource; and
  transmitting the transcoded web resource to the user.

Similarly, according to a second aspect of the present invention, there is provided apparatus for providing a transcoded web resource to a user, the apparatus comprising a transcoder for:
  receiving a request from the user, the request including a first internet domain name;
  identifying a second internet domain name based on the first internet domain name;
  retrieving an existing web resource identified by the second internet domain name;
  transcoding the existing web resource into the transcoded web resource; and
  transmitting the transcoded web resource to the user.

So, the invention can enable the provider of a web resource defined by the second internet domain name to allow a transcoded version of that web resource to be made available via the first internet domain name. Importantly, this can allow the provider of the web resource, e.g. a web site owner, to set up transcoding of the web resource, e.g. their web site, very easily. It can also ensure that the provider of the web resource can control the transcoding.

The first and second internet domain names may have different top level domains but their main distinctive label may be the same. For example, in the case of a generic top level domain, such as ".com" or ".org", the second level domain is usually indicative of the owner, e.g. "bobspizzashop.com". The first and second internet domain names of the invention may therefore have different top level domains but the same second level domain, e.g. "bobspizzashop.com" and "bobspizzashop.mobi". On the other hand, in the case of country code top level domains, the second level domain can effectively be generic and only the third level domain is usually indicative of the owner, e.g. "bobspizzashop.co.uk". The first and second internet domain names of the invention may therefore have different top level domains but the third level domain of one may be the same as the second level domain of the other, e.g. "bobspizzashop.co.uk" and "bobspizzashop.mobi".

The first internet domain name preferably translates (using the domain name system of the internet) to an address of a transcoder, which transcoder maintains a record that maps the first internet domain name to the second internet domain name. This can mean that the request including a first internet domain name is directed to the transcoder. The transcoder can map the first internet domain name to the second internet domain name based on the record it maintains.

The method may further comprise establishing the record that maps the first internet domain name to the second internet domain name by prefixing data in a field of a resource record for the first internet domain name with the second internet domain name.

Indeed, according to a third aspect of the present invention, there is provided a method of mapping a first internet domain name to a second internet domain name, the method comprising:
  prefixing data in a field of a resource record for the first internet domain name with the second internet domain name;
  retrieving the resource record; and
  extracting the first and second internet domain names to establish a mapping of the first internet domain name to the second internet domain name.

Also, according to a fourth aspect of the present invention, there is provided apparatus for mapping a first internet domain name to a second internet domain name, the apparatus comprising processing means for:
  prefixing data in a field of a resource record for the first internet domain name with the second internet domain name;
  retrieving the resource record; and
  extracting the first and second internet domain names to establish a mapping of the first internet domain name to the second internet domain name.

This is very convenient as the resource record can propagate using the existing infrastructure of the domain name system of the internet. For example, separate communication of the mapping of the first internet domain name to the second internet domain name from the web site owner to the transcoder may not be required. Rather, the mapping effectively propagates throughout the domain name system of the internet with the resource record.

Different types of resource record for the first internet domain name can have the second internet domain name added. Preferably, the resource record may be a name server resource record for the first internet domain name. This is convenient as the domain name of the name server that is usually found in the name server resource record is effectively read from right to left by the domain name system of the internet. The prefixed second internet domain name (at the left hand end) may therefore be ignored.

Retrieving the resource record may comprise retrieving a zone file including the resource record. For example, the transcoder may retrieve the zone file from the domain name system of the internet periodically to extract first and second domain names.

According to a fifth aspect of the present invention, there is provided a method for providing a mobile specific web resource to a mobile communication device, the method comprising:
  receiving a request from the mobile communication device, the request including a first internet domain name comprising a top level domain and one or more further elements;
  generating one or more further internet domain names comprising the one or more further elements;
  retrieving one or more web resources identified by the one or more further internet domain names;
  analysing the one or more web resources to determine which is most appropriate for delivery to a mobile communication device; and
  delivering the most appropriate web resource to the mobile communication device.

According to a sixth aspect of the present invention, there is provided an apparatus for providing a mobile specific web resource to a mobile communication device, the apparatus comprising a server for:
  receiving a request from a mobile communication device, the request including a first internet domain name comprising a top level domain and one or more further elements;
  generating further internet domain names each including the at least one or more further elements;
  retrieving web resources identified by the further internet domain names;
  analysing the retrieved web resources to determine which is most appropriate for delivery to the mobile communication device; and
  delivering the most appropriate web resource to the mobile communication device.

So, the present invention can assist in the identification and subsequent delivery of web resources that are appropriate for a mobile communication device. An initial request may be made using a first internet domain name which contains a top level domain. This top level domain may be removed and further internet domain names containing at least some of the remaining elements of the first internet domain name may be generated. Web resources identified by these generated internet domain names can be retrieved where possible and then analysed to determine which of these is most appropriate for the mobile communication device. This allows web resources that are appropriate for mobile communication devices to be identified and delivered to the user.

For example, a web resource owner may have a web page designed for PCs hosted at an IP address associated with internet domain name "bobspizzashop.com" and a version of this web page specifically encoded for mobile communication devices hosted at an IP address associated with internet domain name "mobile.bobspizzashop.com". A user may make a request using the internet domain name "bobspizzashop.com.mobi". By generating second internet domain names that contain the string "bobspizzashop", both "bobspizzashop.com" and "mobile.bobspizzashop.com" can be identified and the web pages hosted at the IP addresses associated with those internet domain names can be retrieved. It can then be determined that the web page hosted at the IP address associated with the domain name "mobile.bobspizzashop.com" is the most appropriate for mobile communication devices, and that web page hosted can be delivered to the user.

Preferred embodiments of the present invention allow the mobile communication device to request internet domain names having a particular top level domain, such as ".mobi", in the knowledge that this will cause the server to determine the most appropriate web resource for the mobile communication device. For example, in preferred embodiments a particular top level domain, such as ".mobi", may be suffixed to existing internet domain names in order to cause the server to determine the most appropriate web resource for the mobile communication device.

Preferably, the first internet domain name and the one or more further internet domain names have different top level domains but the same main distinctive label. For instance, in the example given above, the main distinctive label is "bobspizzashop". This is relatively memorable for a user, who does not need to remember other aspects of the internet domain name at which the web resources designed for the mobile communication device are hosted in order to access them.

Preferably, the first internet domain name is mapped to an IP address of the most appropriate web resource. For example, the first internet domain name may be stored together with an IP address of the most appropriate web resource. This allows the determined web resource to be delivered when subsequent requests are made for the first internet domain name without the requirement to repeat the steps of generating one or more further internet domain names comprising the one or more further elements; retrieving one or more web resources identified by the one or more further internet domain names; and analysing the one or more web resources to determine which is most appropriate for delivery to a mobile communication device.

Referring again to the example given above, it may be that the web resources hosted at internet domain name "mobile.bobspizzashop.com" are imperfectly designed for the specific mobile communication device that has made the request. Alternatively, the web site owner may have only provided a web site for PCs, such as that hosted at internet domain name "bobspizzashop.com". For this reason, the server may be a transcoder. In such circumstances, it is preferable that the most appropriate web resource is transcoded before being delivered to the mobile communication device.

Preferably, the transcoded web resource is stored. This allows the transcoded web resources to be delivered at a later date without the requirement for transcoding step to occur again. In preferred examples, the transcoded web page is stored for a pre-determined period of time. As such, changes in the most appropriate web resource are reflected in the transcoded web resource delivered to the mobile communication device after this period expires.

According to a seventh aspect of the present invention, there is provided a method of providing a mobile specific web resource to a mobile communication device, the method comprising receiving a request from a mobile communication device, the request including a first internet domain name comprising a top level domain and one or more further elements;
generating a truncated internet domain name by removing the top level domain from the first internet domain name;
retrieving a web resource identified by the truncated internet domain name;
analysing the retrieved web resource to determine whether it is appropriate for the mobile communication device;
transcoding the web resource if it is not appropriate for the mobile communication device; and
delivering the web resource to the mobile communication device.

According to an eighth aspect of the present invention, there is provided an apparatus for providing a mobile specific web resource to a mobile communication device, the apparatus comprising a server for:

receiving a request from a mobile communication device, the request including a first internet domain name comprising a top level domain and one or more further elements;
generating a truncated internet domain name by removing the top level domain from the first internet domain name;
retrieving a web resource identified by the truncated internet domain name;
analysing the retrieved web resource to determine whether it is appropriate for the mobile communication device;
transcoding the web resource if it is not appropriate for the mobile communication device; and
delivering the web resource to the mobile communication device.

So, the seventh and eighth aspects of the present invention can also assist in the identification and subsequent delivery of web resources that are appropriate for a mobile communication device. In particular, a request from a mobile communication device can use a first internet domain name made up of a truncated internet domain name and a top level domain, wherein the truncated internet domain name identifies a known web resource. When the request is received, the truncated internet domain name may be generated by removing the top level domain, the web resource may then be retrieved and analysed, and the web resource may then be transcoded in dependence on this analysis. That is, the web resource can be transcoded after an assessment has been made of whether this is necessary.

Use of the words "apparatus", "processor", "transcoder" and so on are intended to be general rather than specific. Whilst these features of the invention may be implemented using an individual component, such as a computer or a central processing unit (CPU), they can equally well be implemented using other suitable components or a combination of components. For example, the invention could be implemented using a hard-wired circuit or circuits, e.g. an integrated circuit, or using embedded software. It can also be appreciated that the invention can be implemented, at least in part, using computer program code. According to another aspect of the present invention, there is therefore provided computer software or computer program code adapted to carry out the method described above when processed by a computer processing means. The computer software or computer program code can be carried by computer readable medium. The medium may be a physical storage medium such as a Read Only Memory (ROM) chip. Alternatively, it may be a disk such as a Digital Video Disk (DVD-ROM) or Compact Disk (CD-ROM). It could also be a signal such as an electronic signal over wires, an optical signal or a radio signal such as to a satellite or the like. The invention also extends to a processor running the software or code, e.g. a computer configured to carry out the method described above.

Preferred embodiments of the invention are described below, by way of example only, with reference to the accompanying drawings.

DETAILED DESCRIPTION OF THE PREFERRED EMBODIMENTS

Figure 1:
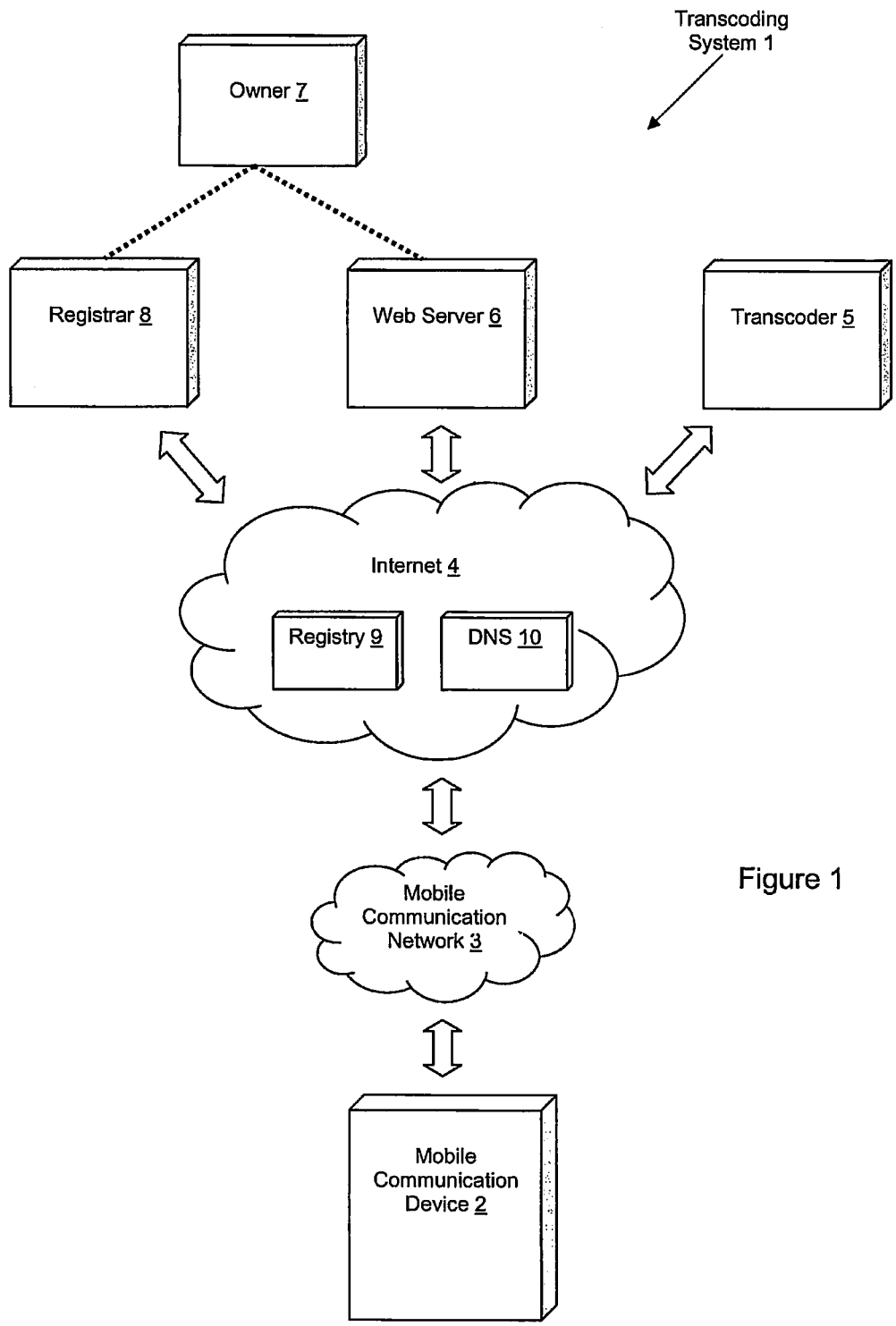
FIG. 1 is a schematic diagram of a transcoding system.

Referring to FIG. 1, a transcoding system 1 comprises a mobile communication device 2, such as a mobile telephone, smart phone, Personal Digital Assistant (PDA) or such like, that retrieves a web resource using a mobile communication network 3 and the internet 4 via a transcoder 5. The mobile communication network 3 is typically a terrestrial or satellite mobile communication network. In other examples, the mobile communication device 2 uses a Wireless Local Area Network (WLAN) or such like to connect to the internet 4 instead of the mobile communication network 3. The mode of connection to the internet 4 is inessential, but the mobile communication device 2 itself is usually characterised by limitations in its ability to use web resources intended for use by desktop and laptop personal computers (PCs).

Web resources include web sites, web pages, feeds, data or video files and so on. In the illustrated example, a web page intended for use by PCs is stored at a web server 6. The web page is part of a web site under the control of a web site owner 7. In this example, the web server 6 is also under the control of the web site owner 7, but in other examples, the web server 6 may be controlled by another party, such as an Internet Service Provider (ISP), on behalf of the web site owner 7.

A registrar 8 is responsible for registering new internet domain names with an internet domain name registry 9, which for simplicity is considered to be part of the internet 4 in FIG. 1. In this example, the registry 9 is responsible for the generic Top Level Domain (TLD) ".mobi" and the registrar 8 handles requests by registrants to register internet domain names with the ".mobi" TLD. The registrar 8 also offers to establish a transcoding service. This is explained in more detail below, considering a case in which the web site owner 7, who owns the existing web site stored at the web server 6, is the registrant for a new internet domain name with the ".mobi" TLD.

Figure 2:
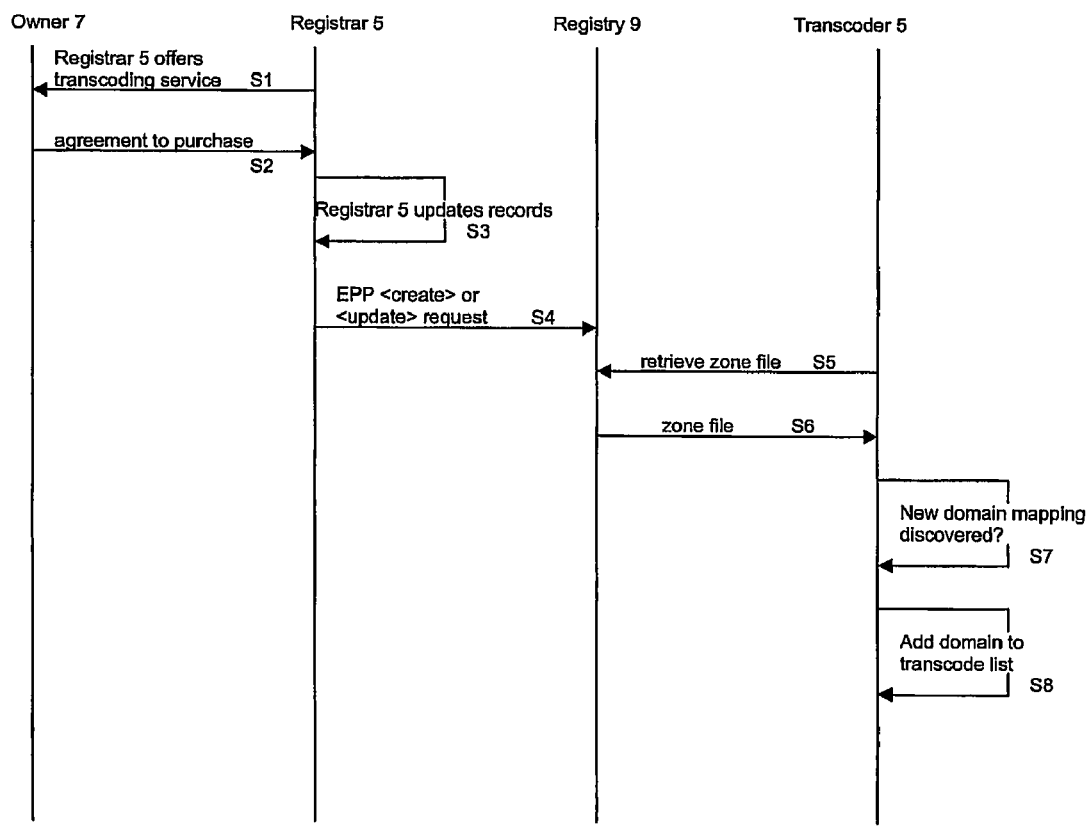
FIG. 2 is a sequence diagram illustrating activation of the transcoding system.

Referring to FIG. 2, during the process of registering a new internet domain name with the ".mobi" TLD, e.g. "bobspizzashop.mobi", at step S1 the registrar 8 offers the transcoding service to the web site owner 7. At step S2, the web site owner 7 accepts the offer and agrees to purchase the transcoding service. During this exchange, the registrar establishes the internet domain name of the web site stored on the web server 6, e.g. "bobspizzashop.com", on which the transcoding service is to be based.

At step S3, the registrar updates its own records with information about the owner 7, the new internet domain name and the internet domain name of the web site on which the transcoding service is to be based. At step S4, the registrar 8 sends a request to the registry 9 to create a resource record for the new internet domain name. In this example, the registrar 8 sends a <create> request at step S4 using Extensible Provisioning Protocol (EPP), as described in the Network Working Group Request for Comments (RFC) 4930 that can be found at http://tools.ietf.org/html/rfc4930.

The EPP <create> request maps the new internet domain name, e.g. "bobspizzashop.mobi" to the Internet Protocol (IP) address of the transcoder 5. The EPP <create> request is required to designate at least one name server for the new internet domain name. The designation comprises an internet domain name for the designated name server provided in a name server field of the EPP <create> request. Typically, the registrar 8 provides the internet domain name for a default name server when a new internet domain name is registered, e.g. "dnsserver.mobi". However, any name server in the Domain Name System (DNS) 10 of the internet 4 can be designated.

Advantageously, the EPP <create> request also includes the internet domain name of the web site stored on the web server 6, e.g. "bobspizzashop.com", on which the transcoding service is to be based. There is no dedicated field for inclusion of this internet domain name in the EPP system. However, the internet domain name can be prefixed to the internet domain name of the designated name server. So, in the given example, the name server field of the EPP <create> request might include the string "bobspizzashop.com.dnsserver.mobi". This same string is recorded by the registry 9 in the name server resource record for the internet domain name "bobspizzashop.mobi" and propagates throughout the DNS 10 by the exchange of zone files, as described at http://www.dns.net.

In particular, the transcoder 5 uses the DNS 10 to update its records. At steps S5 and S6, the transcoder 5 retrieves the zone file for the ".mobi" TLD from the registry 9. The zone file includes the resource record for the newly registered internet domain name, in the given example "bobspizzashop.mobi". The transcoder 5 checks the name server resource record and discovers the internet domain name of the web site stored on the web server 6 prefixed to the internet domain name of the designated name server, e.g. the string "bobspizzashop.com.dnsserver.mobi". At step S7, the transcoder 5 recognises this as defining mapping between the new internet domain name, e.g. "bobspizzashop.mobi", and the internet domain name of the web site stored on the web server 6, e.g. "bobspizzashop.com". Accordingly, at step S8, the transcoder 5 adds the new internet domain name, e.g. "bobspizzashop.mobi", to its list of domain names for which the transcoding service is activated and stores the mapping of this new internet domain name to the web site stored on the web server 6, e.g. "bobspizzashop.com", as a mapping record.

Figure 3:
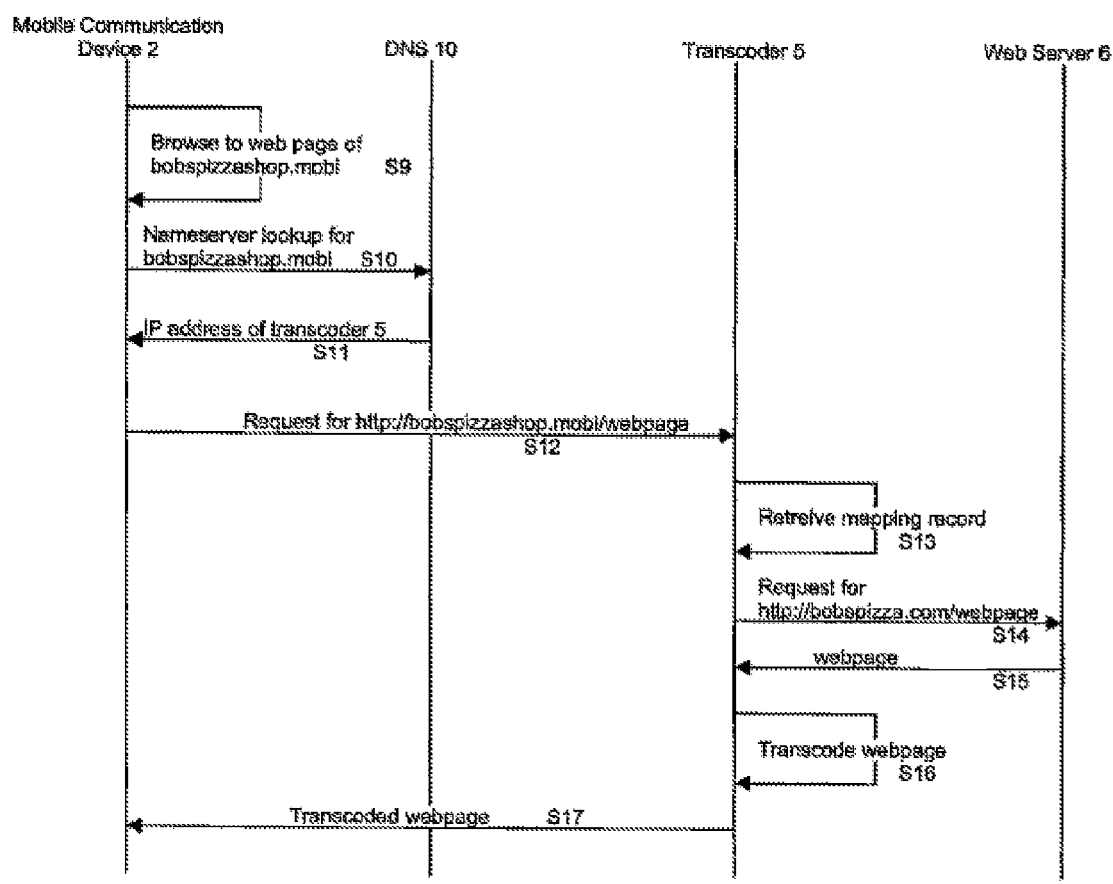
FIG. 3 is a sequence diagram illustrating use of the transcoding system.

Referring to FIG. 3, at step S9 the mobile communication device 2 browses to a web page at the new internet domain name, e.g. "bobspizzashop.mobi/webpage". Assuming the mobile communication device 2 does not know the IP address to which the new internet domain name relates, this initiates a lookup query to the DNS 10, at step S10. The DNS 10 returns the IP address of the transcoder 5 at step S11. Using this IP address, the mobile communication device 2 sends a HyperText Transfer Protocol (HTTP) request to the transcoder 5 for the web page, e.g. using Uniform Resource Locator (URL) "http://bobspizzashop.mobi/webpage", at step S12.

The transcoder 5 recognises the new internet domain name, e.g. "bobspizzashop.mobi", as a domain name on its transcode list. Accordingly, at step S13, the transcoder 5 retrieves the mapping record for the domain name. This retrieval returns the internet domain name of the web site stored on the web server 6, e.g. "bobspizzashop.com". Using this domain name, at step S14 the transcoder 5 sends an HTTP request to the web server 6 for the web page, e.g. using the URL "http://bobspizza.com/webpage". Of course, it may be necessary for the transcoder 5 to perform a lookup query to the DNS 10 in order to establish the IP address of the web server 6 before it can send the HTTP request, but this is omitted from FIG. 3 for clarity.

The web server 6 returns the web page to the transcoder 5 at step S15. At step S16, the transcoder 5 transcodes the web page. The transcoding typically comprises identifying the type of the mobile communication device 2 that requested the web page and altering the web page to be suitable for that device 2. Once the web page has been suitably transcoded, the transcoder 5 sends the transcoded web page to the mobile communication device 2 at step S17.

In a further embodiment of the invention, a preview of the transcoded web page can be provided to the web site owner 7 before the web site owner agrees to purchase the transcoding service at step S2. This is achieved by the registrar 5 using HyperText Markup Language (HTML) code to access the transcoder 5. Suitable HTTP code might retrieve a transcoded version of a web page from the web site stored at the server 6 and present it in an IFRAME of a web page controlled by the registrar 5. This allows the owner 7 to check the transcoding of their web site before purchasing the transcoding service.

The embodiments described above relate to circumstances in which the web site owner 7 of an existing web site stored on the web server 6 registers the new internet domain name, e.g. "bobspizzashop.mobi", with the registrar 8 and subscribes to a transcoding service that delivers a transcoded version of the existing web site when the mobile communication device 2 requests web resources using the new internet domain name. However, in other circumstances, the web site owner 7 has already prepared mobile specific web resources, such as a version of the existing web site stored on the web server 6 suitable for mobile devices, and these mobile specific web resources are stored on the web server 6 alongside the existing web site. The difficulty in such circumstances may be alerting the user of the mobile communication device to the existing mobile specific web resources, and particularly making the user aware of the address of the mobile specific web resource.

For example, consider a web site owner 7 who has established a web page for PCs hosted at an IP address associated with internet domain name "bobspizzashop.com" and has also established a web page specifically encoded for mobile communication devices (a "mobile web page") hosted at an IP address associated with internet domain name "mobile.bobspizzashop.com". A user wishing to access the web resources belonging to the web site owner 7 on a mobile communication device 2 may be unaware of the existence of the mobile web page. Even if aware of the existence of the mobile web page, the user may not know the internet domain name of the mobile web page and may therefore be unable to access it. However, the user is aware of the internet domain name associated with the IP address at which the web page for PCs is hosted (i.e. "bospizzashop.com").

In the preferred embodiment of the present invention, the user may discover the existence and location of a mobile web page by adding the ".mobi" top level domain to the known internet domain when browsing. That is, the user of the mobile communication device 2 may browse to "bobspizzashop.com.mobi". Moreover, if no mobile web page exists, the user of the mobile communication device 2 may use the same technique, i.e. browsing to "bobspizzashop.com.mobi", to access a transcoded version of the web page for PCs at "bobspizzashop.com". This transcoded version of the web page for PCs is adapted so as to be suitable for the mobile communication device 2. In order to facilitate this, the registrar 8 generates a variety of new internet domain names having ".mobi" as the TLD and another element as the second level domain. These other elements used as second level domains are typically those known for use as top level domains for existing web resources. For example, the registrar 8 may generate "com.mobi", where "com" is the second level domain and ".mobi" is the top level domain. Other domain names that the registrar 8 may generate can include "uk.mobi", "org.mobi", "info.mobi" and so on. In general the registrar generates domain names that use existing generic top level domains (gTLDs), such as ".com", "info", ".co" and so on, as the second level domain and ".mobi" as the top level domain.

The registrar 8 then registers these domain names with the registry 9. Specifically, the registrar 8 then sends requests to the registry 9 to create resource records for the new internet domain names. In this example, the registrar 8 sends <create> requests using Extensible Provisioning Protocol (EPP), as described in the Network Working Group Request for Comments (RFC) 4930 that can be found at http://tools.ietf.org/html/rfc4930. The EPP <create> requests map the new internet domain names, such as "com.mobi", to the Internet Protocol (IP) address of the transcoder 5. This mapping of the new internet domain names to the IP address of the transcoder 5 propagates throughout the domain name system (DNS) 10 of the internet through the exchange of zone files as explained at www.dns.net.

The new internet domain names are mapped to the IP address of the transcoder 5 in the DNS 10 of the internet in such a manner that the addition of lower level domains to the new internet domain names does not change this mapping. For example, where the new internet domain name is "com.mobi", any internet domain name of the form "*.com.mobi", where "*" is a wildcard which may represent any allowable internet domain name element, is mapped to the transcoder 5.

Preferably, new internet domain names which use the majority of or even all existing gTLDs as a second level domain in combination with ".mobi" as a TLD are registered. Accordingly, when browsing the internet, a user may add ".mobi" to the end of an existing internet domain name in order to access the transcoder 5 and make use of the invention as described below.

Figure 4:
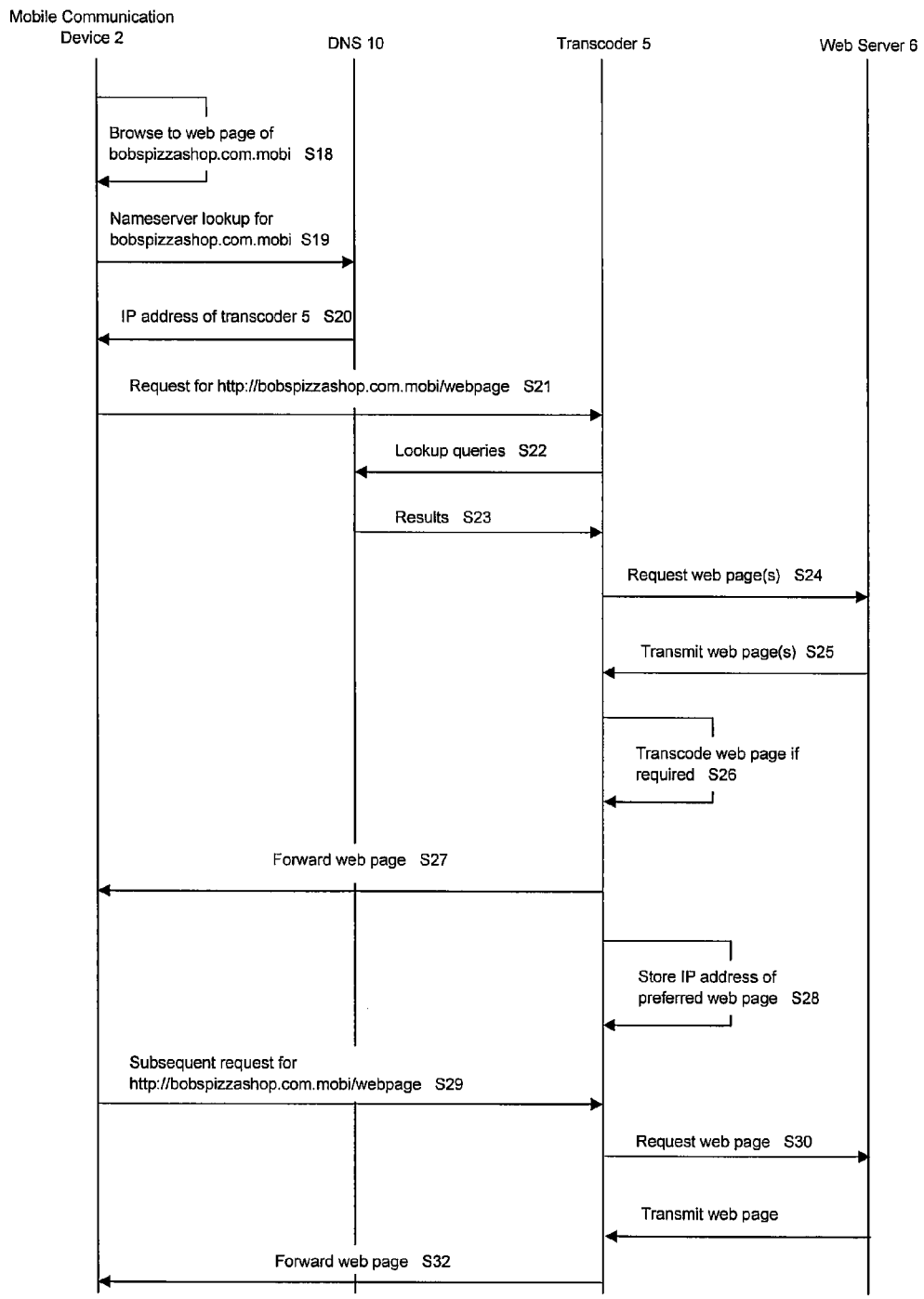
FIG. 4 is a sequence diagram illustrating an alternative use of the transcoding system.

Referring to FIG. 4, in the present embodiment, steps S18 to S21 correspond to steps S9 to S12 of the embodiment described with reference to FIGS. 2 and 3. In other words, at step S18 the mobile communication device 2 browses to a web page at an internet domain name having the ".mobi" top level domain, e.g. "bobspizzashop.com.mobi". Assuming the mobile communication device 2 does not know the IP address associated with the internet domain name "bobspizzashop.com.mobi", this initiates a lookup query to the DNS 10, at step S19. The DNS 10 provides the IP address of the transcoder 5 to the mobile communication device 2 at step S20. Using this IP address, the mobile communication device 2 sends a HyperText Transfer Protocol (HTTP) request to the transcoder 5 for the web page, e.g. using Uniform Resource Locator (URL) "http://bobspizzashop.com.mobi/webpage", at step S21.

The transcoder then 5 generates further internet domain names using the internet domain name "bobspizzashop.com.mobi". In particular, the transcoder 5 generates a truncated internet domain name by removing the top level domain name, i.e. ".mobi", thereby leaving the internet domain name associated with the PC web page, i.e. "bobspizzashop.com".

The transcoder may additionally generate a number of potential internet domain names based on the truncated internet domain name. For example, the transcoder may generate potential internet domain names "m.bobspizzashop.com" and "mobile.bobspizzashop.com". The potential internet domain names typically share the main distinctive element (in this case, "bobspizzashop") with the truncated internet domain name and the internet domain name used in the request sent by the mobile communication device 2, while they may add or remove other elements to or from the truncated internet domain name.

At step S22, the transcoder 5 initiates lookup queries to the DNS 10 for the further internet domain names it has generated, i.e. the truncated internet domain name and the potential internet domain names. For example, the transcoder 5 may initiate lookup queries for "bobspizzashop.com", "m.bobspizzashop.com" and "mobile.bobspizzashop.com".

At step S23, the DNS 10 provides the results of the lookup queries to the transcoder 5. These will include the IP address associated with the PC web page at the truncated internet domain name "bobspizzashop.com" as well any IP addresses that are associated with the potential internet domain names. It is likely that not all of the prospective internet domain names used in the lookup queries will have a validly assigned IP address, in which case the DNS 10 returns either no result or a conventional error message for these internet domain names.

Using the IP addresses received from the DNS 10, the transcoder 5 sends HyperText Transfer Protocol (HTTP) requests, at step S24, to the web server 6 for web pages using Uniform Resource Locator (URLs) based on the truncated internet domain name and the potential internet domain names, such as "http://bobspizzashop.com/webpage", "http://mobile.bobspizzashop.com/webpage", "http://m.bobspizzashop.com/webpage", "http://bobspizzashop.com/mobile" and so on. Although a single web server 6 is illustrated in FIG. 2, the skilled person will appreciate that different web pages may be hosted by different web servers. The IP addresses received by the transcoder 5 allow it to direct its request to the correct web server(s).

The web server 6 then returns the requested web pages to the transcoder 5, at step S25. These will include at least the PC web page associated with internet domain name "bobspizzashop.com" and may include other web pages which the transcoder 5 has located, which may or may not be optimised for use by mobile communication device 2. The transcoder 5 analyses the returned web pages to determine which is the most appropriate for delivery to the mobile communication device 2. In the example described above, the web page identified by internet domain name "bobspizzashop.com" is designed for viewing on a PC, while the web page identified by internet domain name "mobile.bobspizzashop.com" is designed for viewing on the mobile communication device 2. It is therefore preferable to deliver the web page from "mobile.bobspizzashop.com" to the mobile communication device 2, instead of that from "bobspizzashop.com".

There may be multiple web pages designed for mobile communication devices 2. For example, a first mobile web page designed for mobile communication devices 2 may be stored at an address associated with internet domain name "mobile.bobspizzashop.com" and a second web page designed for mobile communication devices 2 may be stored at an address associated with internet domain name "m.bobspizzashop.com". In this case, the transcoder 5 will determine which of the web pages designed for mobile communication devices 2 is most appropriate for the particular mobile communication device 2 that made the original request.

In some cases, it may be desirable to transcode the web page determined as most suitable for the mobile communication device 2. This may be because none of the identified web pages are designed for mobile communication devices in general (for example, if the mobile web site at internet domain name "mobile.bobspizzashop.com" did not exist), or because they have not been optimised for the particular mobile communication device 2 that made the initial request at step S1. At step S26, the transcoder 5 transcodes the determined web page if required.

The web page determined to be most appropriate for the mobile communication device is then returned to the mobile communication device, at step S27. As explained above, the web page returned to the mobile communication device may or may not have been transcoded by the transcoder 5.

It is notable that the transcoder 5 has now established which internet domain name associated with "bobspizzashop.com.mobi" provides the most appropriate web page for the mobile communication device 2. In order to avoid duplication of effort, and to reduce lag times in future, at step S28, the transcoder 5 stores this information. That is, the transcoder 5 maps the internet domain name "bospizzashop.com.mobi" to the address of the most appropriate web page. The transcoder 5 may also store the most appropriate web page itself. The transcoded version of the web page may also be stored. As such, future requests for "bobspizzashop.com.mobi" are dealt with more efficiently without the requirement to identify IP addresses by trying a variety of lookup queries at the DNS 10. This is described below with reference to steps S29 to S32.

At step S29 a subsequent request for "bobspizzashop.com.mobi" is made. For clarity, this subsequent request is indicated as coming from mobile communication device 2, although in practice it could originate with a different mobile communication device. On receiving the request, the transcoder 5 recognises the internet domain name "bobspizzashop.com.mobi" as this information has been saved by the transcoder 5 at step S28. The transcoder 5 has also saved the URL of the web page which was determined to be most appropriate for delivery to the mobile communication device 2. Accordingly, the transcoder 5 may use this information to request the most appropriate web site from the web server 6, at step S30. The web server 6 returns the web page to the transcoder 5, at step S31, and this is subsequently forwarded to the mobile communication device 2, at step S32.

If the web page has been previously transcoded by transcoder 5, then there is no need for the transcoder 5 to obtain the web page from the web server 6 again (steps S30 and S31). In these circumstances, the transcoded web page is simply returned to the mobile communication device 2 rather than returning the web page (step S32).

Information may be stored by the transcoder 5 for a limited period to ensure that content delivered to the mobile communication device 2 reflects the current state of the web site. For example, transcoded versions of web pages may be stored for a week, a day, or any other appropriate time period. The appropriate time period may vary according to the type of content held on the web page. For example, a news web page may be expected to be updated regularly, meaning that it would only be appropriate to store a transcoded version of the page for a short period, if at all.

The described embodiments of the invention are only examples of how the invention may be implemented. Modifications, variations and changes to the described embodiments will occur to those having appropriate skills and knowledge. In particular, it is envisaged that the transcoding service could be activated after a new internet domain name has been registered. In this case, an EPP <update> request may be sent instead of an EPP <create> request at step S4 in FIG. 2. It is also envisaged that, as well as the transcoder retrieving a zone file at steps S5 and S6 to update the transcode list (which may occur only once a day), the transcoder 5 may perform a look up to the DNS 10 whenever it receives an HTTP request including an internet domain name not on the transcode list. This ensures prompt activation of the transcoding service. These modifications, variations and changes may be made without departure from the scope of the invention defined in the claims and its equivalents.

What is claimed is:

1. A method of providing a transcoded web resource to a user, the method comprising:
    establishing a record that maps the first internet domain name to the second internet domain name by prefixing data in a field of a resource record for the first internet domain name with the second internet domain name;
    receiving a request from the user, the request including a first internet domain name;
    identifying a second internet domain name based on the first internet domain name;
    retrieving an existing web resource identified by the second internet domain name;
    transcoding the existing web resource into the transcoded web resource; and
    transmitting the transcoded web resource to the user.

2. The method of claim 1, wherein the first and second internet domain names have different top level domains but the same main distinctive label.

3. The method of claim 1, wherein the first internet domain name translates to an address of a server, which server maintains a record that maps the first internet domain name to the second internet domain name.

4. A method of mapping a first internet domain name to a second internet domain name, the method comprising:
    prefixing data in a field of a resource record for the first internet domain name with the second internet domain name;
    retrieving the resource record; and
    extracting the first and second internet domain names to establish a mapping of the first internet domain name to the second internet domain name.

5. The method of claim 4, wherein the field of the resource record is a name server field for the first internet domain name.

6. The method of claim 4, wherein retrieving the resource record comprises retrieving a zone file including the resource record.

7. A method of providing a mobile specific web resource to a mobile communication device, the method comprising
    receiving a request from a mobile communication device, the request including a first internet domain name comprising a top level domain and one or more further elements;
    generating a truncated internet domain name by removing the top level domain from the first internet domain name;
    retrieving a web resource identified by the truncated internet domain name;
    analyzing the retrieved web resource to determine whether it is appropriate for the mobile communication device;
    transcoding the web resource if it is not appropriate for the mobile communication device; and
    delivering the web resource to the mobile communication device.

8. Apparatus for providing a transcoded web resource to a user, the apparatus comprising a transcoder with a processor for
    establishing a record that maps the first internet domain name to the second internet domain name by prefixing data in a field of a resource record for the first internet domain name with the second internet domain name;
    receiving a request from the user, the request including a first internet domain name;
    identifying a second internet domain name based on the first internet domain name;
    retrieving an existing web resource identified by the second internet domain name;
    transcoding the existing web resource into the transcoded web resource; and
    transmitting the transcoded web resource to the user.

9. Apparatus for mapping a first internet domain name to a second internet domain name, the apparatus comprising a processor that:
    prefixes data in a field of a resource record for the first internet domain name with the second internet domain name;
    retrieves the resource record; and
    extracts the first and second internet domain names to establish a mapping of the first internet domain name to the second internet domain name.

10. Apparatus for providing a mobile specific web resource to a mobile communication device, the apparatus comprising a server with a processor for:
    receiving a request from a mobile communication device, the request including a first internet domain name comprising a top level domain and one or more further elements;
    generating a truncated internet domain name by removing the top level domain from the first internet domain name;
    retrieving a web resource identified by the truncated internet domain name;
    analyzing the retrieved web resource to determine whether it is appropriate for the mobile communication device;
    transcoding the web resource if it is not appropriate for the mobile communication device; and
    delivering the web resource to the mobile communication device.

* * * * *